US009598832B2

(12) United States Patent
Abrisketa Lozano

(10) Patent No.: US 9,598,832 B2
(45) Date of Patent: Mar. 21, 2017

(54) ASSEMBLY FOR MOORING A PILE WITH A MOORING LINE AND METHOD IMPLEMENTED WITH SAID ASSEMBLY

(71) Applicant: VICINAY MARINE INNOVACION (AIE), Bilbao (ES)

(72) Inventor: Nagore Abrisketa Lozano, Leioa (ES)

(73) Assignee: VICINAY MARINE INNOVACION (AIE), Bilbao (ES)

( * ) Notice: Subject to any disclaimer, the term of this patent is extended or adjusted under 35 U.S.C. 154(b) by 32 days.

(21) Appl. No.: 14/737,791

(22) Filed: Jun. 12, 2015

(65) Prior Publication Data
US 2015/0361634 A1    Dec. 17, 2015

(30) Foreign Application Priority Data

Jun. 13, 2014   (EP) .................................... 14382223

(51) Int. Cl.
*E02D 5/74*   (2006.01)
*B63B 21/20*   (2006.01)
*B63B 21/22*   (2006.01)
*B63B 21/50*   (2006.01)
(Continued)

(52) U.S. Cl.
CPC ................ *E02D 5/74* (2013.01); *B63B 21/20* (2013.01); *B63B 21/22* (2013.01); *B63B 21/50* (2013.01); *E02D 5/223* (2013.01); *F16G 15/00* (2013.01); *B63B 2021/203* (2013.01); *B63B 2021/505* (2013.01); *Y10T 24/3902* (2015.01); *Y10T 29/49828* (2015.01)

(58) Field of Classification Search
CPC .......................... B63B 2021/203; B63B 21/20

USPC ......................................................... 405/224
See application file for complete search history.

(56) References Cited

U.S. PATENT DOCUMENTS 5,992,060 A * 11/1999 Treu ........................ B63B 21/22
                                                    114/296
6,122,847 A *  9/2000 Treu ........................ B63B 21/22
                                                    114/296
(Continued)

FOREIGN PATENT DOCUMENTS

GB   WO 2004011327 A1 *  2/2004  ............. B63B 21/22
WO   WO2006055581 A2      5/2006
WO   WO2014083056 A1      6/2014

OTHER PUBLICATIONS

Extended European Search Report (EESR) issued by the European Patent Office for EP Application No. 14382223.7, on Jan. 8, 2015, 6 pages, Munich Germany.

*Primary Examiner* — Tara M. Pinnock
(74) *Attorney, Agent, or Firm* — Edell, Shapiro & Finnan, LLC

(57) ABSTRACT

Assembly for mooring a pile with a mooring line. The assembly according to one implementation has a frame disposed on the pile that is configured to support a connecting end of a chain, the other end of the chain being connected to the pile. The assembly having an attachment assembly having an attachment element connected at one end of the mooring line. A coupler coupled to the attachment element allows positioning the attachment element with respect to the connecting end of the chain. The coupler includes a guide for positioning the attachment element on the frame. A fixing assembly is provided allowing the interconnection of the attachment element and the connecting end of the chain.

23 Claims, 13 Drawing Sheets

(51) Int. Cl.
    *E02D 5/22* (2006.01)
    *F16G 15/00* (2006.01)

(56) References Cited

U.S. PATENT DOCUMENTS

| | | | | |
|---|---|---|---|---|
| 6,409,428 B1 * | 6/2002 | Moog | ................ | E21B 43/0107 |
| | | | | 166/342 |
| 6,457,908 B1 * | 10/2002 | Bergeron | ................ | B63B 21/04 |
| | | | | 114/230.1 |
| 6,554,541 B1 | 4/2003 | Antonsen | | |
| 6,685,396 B1 * | 2/2004 | Bergeron | ................ | B63B 21/04 |
| | | | | 114/296 |
| 6,851,895 B2 * | 2/2005 | Jarry | ................ | B63B 21/22 |
| | | | | 114/296 |
| 7,976,246 B1 * | 7/2011 | Krabbendam | .......... | B63B 21/27 |
| | | | | 114/230.1 |
| 8,016,521 B1 * | 9/2011 | Krabbendam | .......... | E02D 15/08 |
| | | | | 405/224 |
| 8,047,151 B2 | 11/2011 | Foo et al. | | |
| 8,516,784 B2 | 8/2013 | Abrisketa Lozano | | |

\* cited by examiner

ASSEMBLY FOR MOORING A PILE WITH A MOORING LINE AND METHOD IMPLEMENTED WITH SAID ASSEMBLY

CROSS-REFERENCE TO RELATED APPLICATIONS

This application claims the benefit and priority to European Appl. No. EP14382223.7, filed Jun. 13, 2014.

TECHNICAL FIELD

The present invention relates to assemblies for mooring a pile with a mooring line, particularly for mooring a driving pile, and methods for mooring a pile with a mooring line.

BACKGROUND

Drilling vessels or offshore platforms must be moored to the seabed in a specific fixed area so that they are not subject to movements that may be caused by ocean currents or atmospheric conditions. Different types of anchors are used and are usually driven into the seabed and moored to mooring lines attached to said vessels or platforms. One type of said anchors are piles that are driven into the seabed, each pile incorporating a chain section, one of the ends of said chain being attached to the pile by means of a lug, and the other end of the chain must be attached to the mooring line which is deployed from the surface of the water. Mooring lines are usually heavy chains, it also being possible to use legs integrating chain sections and wire or polyester sections connected to one another according to the requirements of the mooring line at each point throughout its extension as mooring lines.

Suction piles are known, which are cylindrical-shaped metal structures that are driven into the seabed by means of suctioning sand and sediments from inside the pile. To that end, they incorporate at the upper end a cover incorporating the equipment necessary to be able to perform the suction. Another type of piles are driving piles which are also cylindrical-shaped metal structures driven into the seabed with the aid of a hydraulic hammer.

U.S. Pat. No. 6,851,895 B2 describes an assembly and a method for mooring a suction pile with a mooring line in the seabed. Said assembly for mooring a pile with a mooring line comprises a frame coupleable to the pile, said frame supporting a connecting end of a chain incorporated in the pile and intended for being connected with the mooring line, and a mooring end of the chain opposite the connecting end being connected to the outside of the pile by means of a pad eye or lug. The mooring assembly also comprises an attachment assembly which is connected at one end of the mooring line, said attachment assembly comprising an attachment element which is a wire attached to the last link of a chain forming the mooring line and which is suitable for being held in the frame of the mooring assembly. The attachment assembly also comprises coupling means, which are hooks, coupled to the attachment element, which are attached to the frame and allow positioning the attachment element with respect to the frame of the mooring assembly. Therefore, the attachment assembly of the mooring assembly allows coupling the last link of the chain forming the mooring line with the frame of the mooring assembly, for positioning said last link of the chain on the frame in subsequent operations, and then attaching said last link of the mooring line with the connecting end of the chain incorporated in the pile with external means.

SUMMARY OF THE DISCLOSURE

According to one implementation an assembly for mooring a pile with a mooring line is provided comprising a frame coupleable to the pile, said frame supporting a connecting end of a chain incorporated in the pile and being intended for being connected with the mooring line, and the other end of the chain being connected to the outside of the pile. The mooring assembly also comprises an attachment assembly which is connected at one end of the mooring line, the attachment assembly comprising an attachment element attached to the last link of a chain forming the mooring line and suitable for being supported in the frame, and coupling means coupled to the attachment element which allow positioning the attachment element with respect to the connecting end of the chain. The coupling means comprises guide means for positioning the attachment element on the frame, positioning the attachment element with respect to the connecting end of the chain incorporated in the pile, and fixing means allowing the interconnection of the attachment element and the connecting end of the chain incorporated in the pile.

Another implementation relates to a method for mooring a pile with a mooring line which is implemented with a mooring assembly, the mooring assembly may be as defined above.

In the mooring assembly and method of the state of the art, the attachment assembly of the mooring assembly is formed by a wire attached to the mooring line and hooks coupled to the end of said wire and attached to the frame. Therefore, to be able to then position the last link of the chain forming the mooring line on the frame, the mooring line must be pulled taut from the offshore platform or vessel located on the surface, and then guiding the positioning of a section of the mooring line on the frame by means of said platform or vessel. After said positioning, an underwater ROV (remotely operated vehicle) transporting the necessary attachment means such as a bolt, nut, etc., must be deployed to be able to attach the last link of the mooring line with the connecting end of the chain incorporated in the pile.

According to some implementations disclosed herein, the coupling means of the attachment assembly of the mooring assembly incorporates guide means, for positioning the attachment element with respect to the connecting end of the chain, incorporated in the pile and located in the frame, and fixing means allowing the interconnection of the attachment element and the connecting end of the chain incorporated in the pile. Therefore, operations of pulling a section of the mooring line taut, and positioning it on the frame remotely from the platform or vessel on the surface, are not required. Nor is it necessary to transport in subsequent operations the attachment means for attaching the last link of the mooring line with the connecting end of the chain incorporated in the pile. According to some implementations all the means necessary for mooring the pile and the mooring line, such as the frame and the attachment assembly, are transported from the surface separately from the pile and in a single operation.

DETAILED DESCRIPTION

Mooring a drilling or production vessel or an offshore platform with piles driven into the seabed is performed by attaching one or several mooring lines that are deployed from said vessel or offshore platform with a chain section attached to said piles. The mooring lines can be entirely a chain, or a wire or a set of wires ending in a chain section which is attached to the chain section attached to the piles.

To be able to perform the initial mooring, mooring assemblies which allow attaching the chains of the mooring line and the pile are used with the aid of an ROV. The pile is deployed from the surface for being driven into the seabed, and the frame which is intended for supporting the chain section attached to the pile is then incorporated, so the weight of the pile being driven into the seabed decreases significantly with respect to piles incorporating the frame as they are deployed from the surface. The mooring line incorporating the means necessary to perform coupling between the pile and the mooring line is then deployed.

Figure 1:
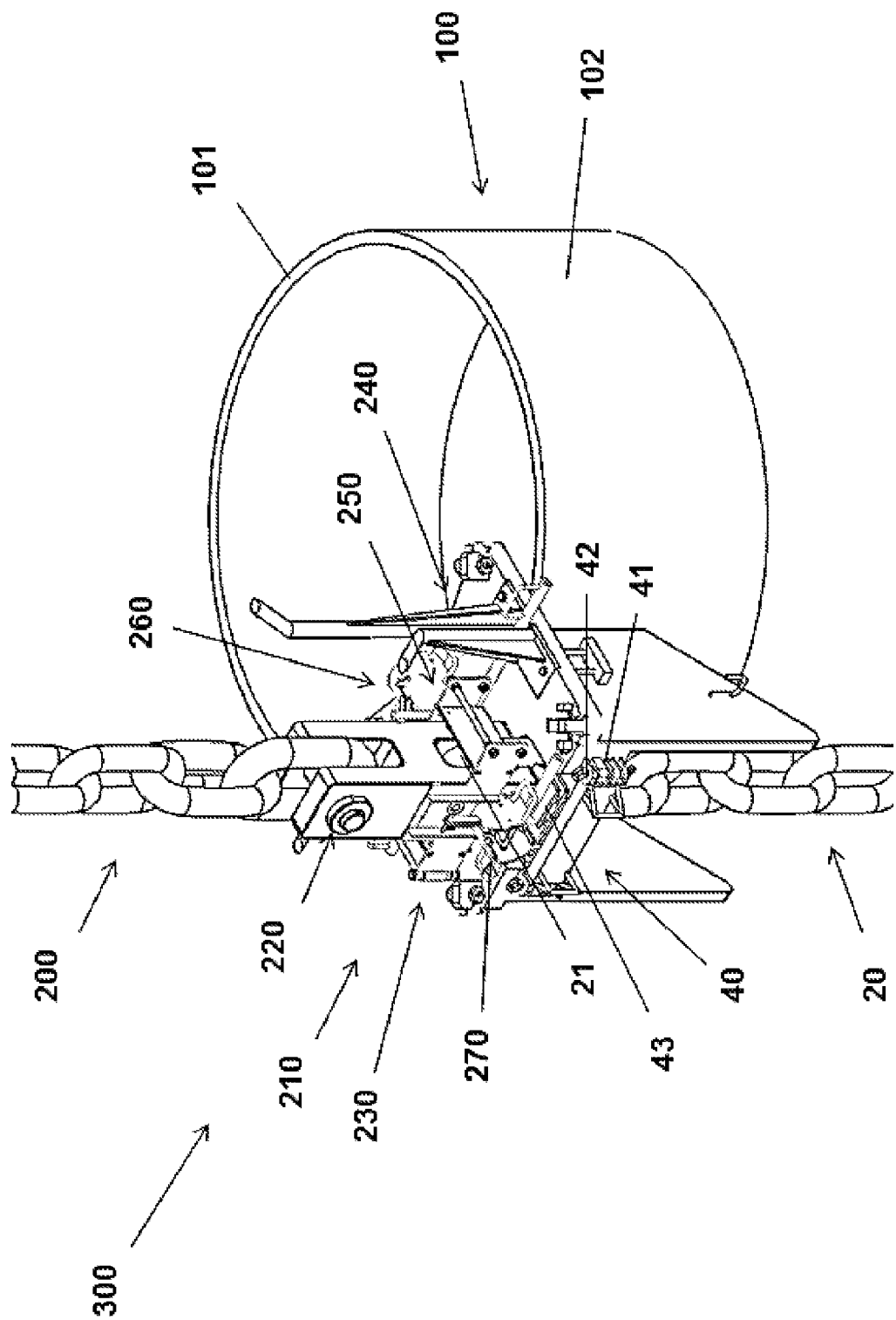
FIG. 1 shows a perspective view of a mooring assembly according to one implementation coupled to the upper end of a partially shown pile.
Figure 2:
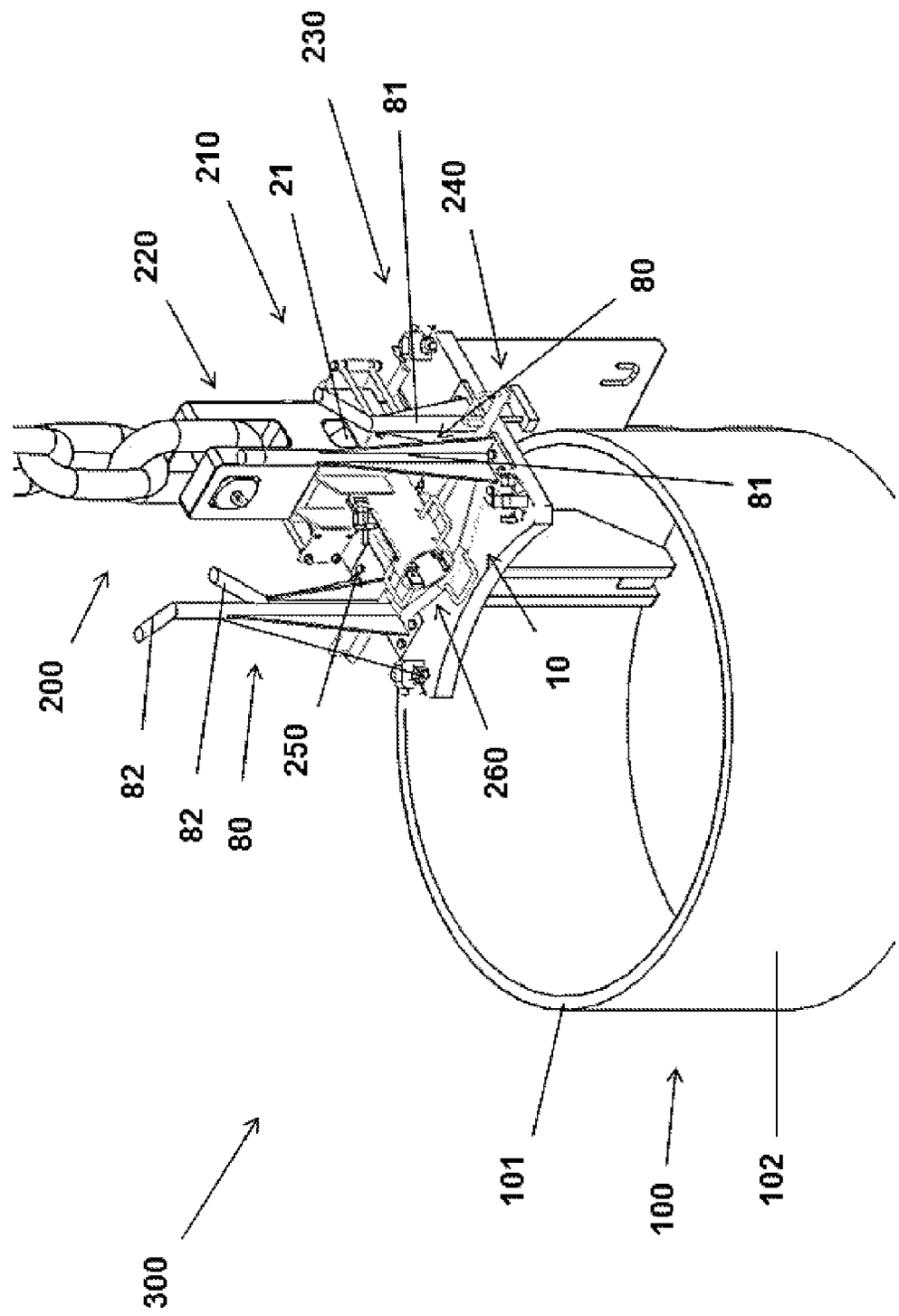
FIG. 2 shows another perspective view of the mooring assembly of FIG. 1 coupled to the upper end of the pile.

FIG. 1 shows a perspective view of an implementation of the mooring assembly 300 coupled to the upper end 101 of a partially shown pile 100. FIG. 2 shows another perspective view of the mooring assembly 300 of FIG. 1 coupled to the upper end 101 of the pile 100. The pile 100 in the implementation shown is a driving pile, the lower end of which (not shown in the drawings) is driven into the seabed. According to some implementations the pile 100 is a hollow cylinder with open upper end 101 and a side wall 102.

The mooring assembly 300 comprises a frame 10 coupled to the pile 100, said frame 10 supporting a connecting end 21 of a chain 20 incorporated in the pile 100. This connecting end 21 of the chain 20 is intended for being connected to a mooring line 200. According to one implementation the last section of the mooring line is at least one chain. The other end of the mooring line 200 (not shown in the drawings) is connected to an offshore platform or a production or drilling vessel located on the surface of the water. According to some implementations the other end of the chain 20 is connected to the outside of the pile 100 by means of a pad eye or lug (not shown in the drawings).

The mooring assembly 300 also comprises an attachment assembly 210 which is connected to one end of the mooring line 200, the attachment assembly 210 comprising an attachment element 220 attached to, for example, the last link of the chain forming the mooring line 200. This attachment element 220 is suitable for being held in the frame 10. The attachment assembly 210 also comprises coupling means 230 which is coupled to the attachment element 220 and allows positioning the attachment element 220 with respect to the connecting end 21 of the chain 20. The coupling means 230 comprises guide means 240 which allows positioning the attachment element 220 on the frame 10, positioning the attachment element 220 with respect to the connecting end 21 of the chain 20 incorporated in the pile 100. The coupling means 230 also comprises fixing means 250 allowing the interconnection of the attachment element 220 and the connecting end 21 of the chain 20 incorporated in the pile 100.

According to some implementations, the attachment element 220 is an H-shaped shackle comprising a first end 221 connected to the mooring line 200 in, for example, the last link of the chain. The connection is made by means of a first bolt 228 arranged at said end 221 of the attachment element 220. The first bolt 228 traverses the side walls 224 of the attachment element 220 through holes made in said side walls 224 at the end 221, the first bolt 228 being attached to said side walls 224 by means of nuts.

The attachment element 220 comprises a second end 222 which is suitable for being connected to the connecting end 21 of the chain 20 arranged in the frame 10. The fixing means 250 of the coupling means 230 comprise a second movable bolt 262 which allows fixing the connecting end 21 of said chain 20 to the second end 222 of the attachment element 220, as will be described below.

Figure 3:
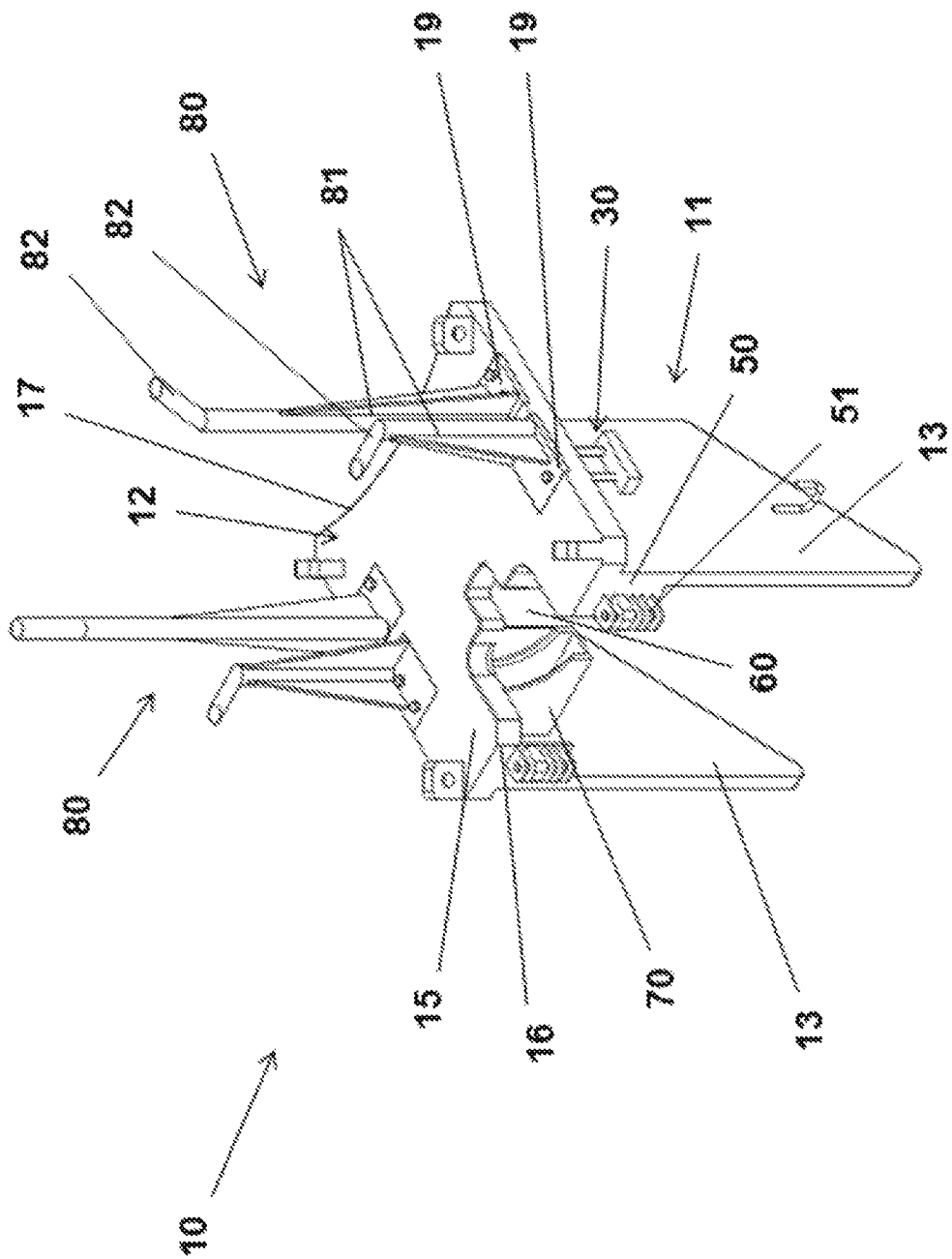
FIG. 3 shows a front perspective view of the frame of the mooring assembly of FIG. 1.
Figure 4:
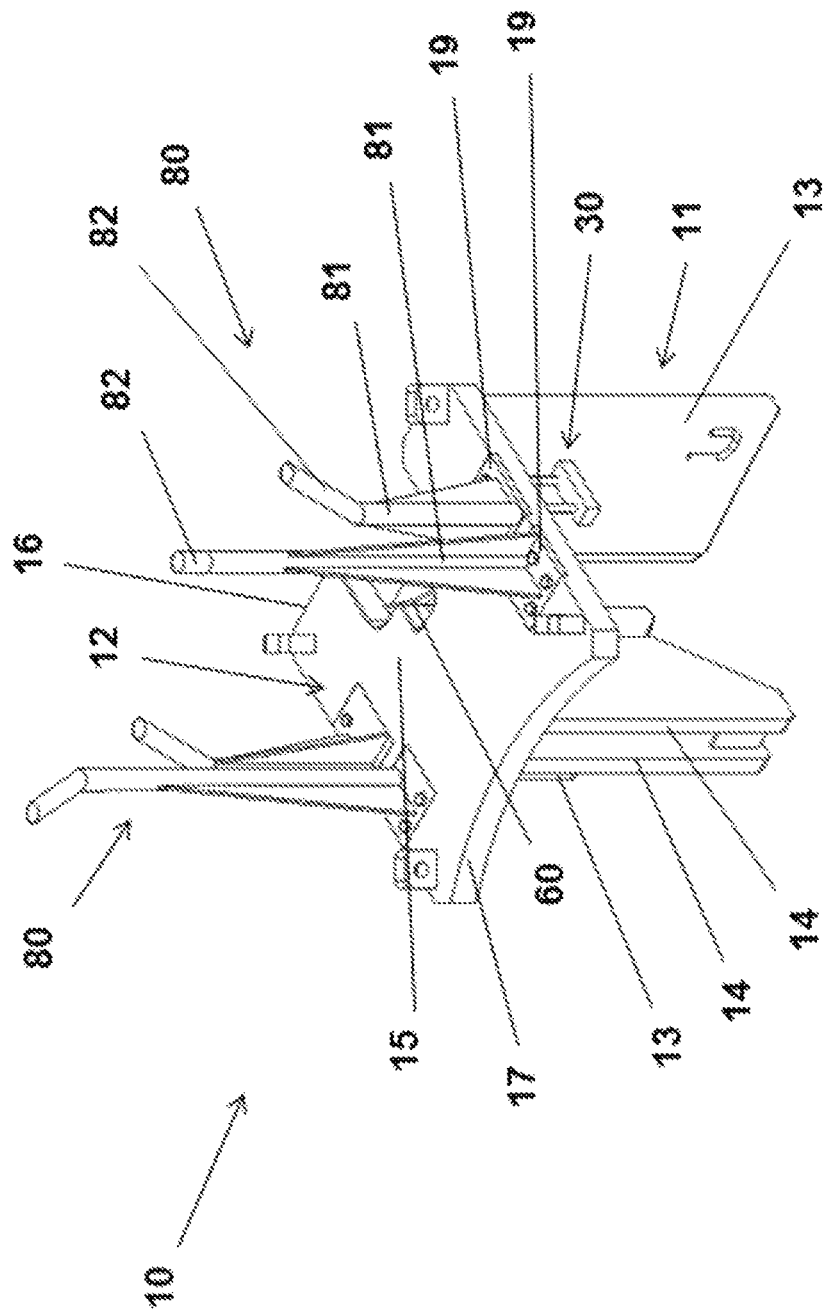
FIG. 4 shows a rear perspective view of the frame of FIG. 3.

FIG. 3 shows a front perspective view of the frame 10 of the mooring assembly 300 of FIG. 1, and FIG. 4 shows a rear perspective view of the frame 10 of FIG. 3. The frame 10 may be a metal structure comprising a horizontal plate 12, the horizontal plate 12 comprising a support area 15 where the attachment element 220 is held. The frame 10 also comprises adaptation means 11 which is attached to the horizontal plate 12, said adaptation means 11 allowing coupling the frame 10 to the pile 100 at the upper end 101 thereof.

According to some implementations the adaptation means 11 comprises a plurality of vertical plates which project from the lower part of the horizontal plate 12 of the frame 10 and are oriented vertically. Said vertical plates comprise a plurality of vertical side plates 13 which, according to one implementation of the mooring assembly 300, are two in number. Said vertical side plates 13 are arranged on each lateral end of the horizontal plate 12, and on the lower part of said horizontal plate 12 from the front edge 16 of said horizontal plate 12 up to a distance such that it allows contact with the side wall 102 of the pile 100 through the outer part, when the frame 10 is coupled to said pile 100.

The vertical plates of the adaptation means 11 also comprise a plurality of vertical central plates 14 which, according to one implementation of the mooring assembly 300, are two in number. Said vertical central plates 14 are arranged around the center of the horizontal plate 12 separated by a small gap, and run along the lower part of said horizontal plate 12 from the rear edge 17 of said horizontal plate 12 up to a distance such that it allows contact with the side wall 102 of the pile 100 through the inner part, when the frame 10 is coupled to said pile 100.

With this configuration of the adaptation means 11 of the frame 10, a space is created between the vertical side plates 13 and the vertical central plates 14 which, according to some implementations, is equivalent to the thickness of the side wall 102 of the pile 100. Therefore, this configuration allows fitting the frame 10 at the upper end 101 of the pile 100, one edge of the vertical side plates 13 being held on the side wall 102 of the pile 100 through the outer part thereof, and one edge of the vertical central plates 14 being held on the side wall 102 of the pile 100 through the inner part thereof. When the frame 10 is coupled to the pile 100 at the upper end thereof 101, the horizontal plate 12 of the frame 10 projects on both sides of the side wall 102, and the support area 15 of the horizontal plate 12 for holding the attachment element 220 is located outside the pile 100. This configuration of the frame 10 of the mooring assembly 300 allows coupling said frame 10 to the upper end 101 of the pile 100 directly and without adding attachment elements. Similarly, when the mooring line 200 has been completely moored to the pile 100, the frame 10 can be removed and can thus be used in the future. As will be described below, the attachment assembly 210 of the mooring assembly 300 can also be removed, such that the entire mooring assembly 300 can be removed, thus significantly improving the costs of each mooring operation. Freeing the upper end 101 of the pile 100 from the mooring assembly 300 allows the use thereof for other operations, such as, for example, the installation of a cathodic protection system.

The support area 15 of the horizontal plate 12 comprises a recess 60 in the front edge 16 of the horizontal plate 12 that opens outwardly with respect to the pile 100. According to one implementation this recess 60 is U-shaped and comprises a smaller, integrated U-shaped recess that opens into the lower wall of the U. This shape of the recess 60 allows the passage of the chain 20 from the front edge 16 of the horizontal plate 12.

According to some implementations the frame 10 comprises support elements 70 which are arranged in the lower part of the horizontal plate 12. In the implementation of FIG. 3 the support elements 70 are two in number, have the shape of an open case with a base, a rear wall which is attached to one of the vertical side plates 13 in the inner part thereof, and two side walls with a section in the form of a partial circumference. The two support elements 70 are arranged below the main U of the recess 60 and are separated by a gap. Said support elements 70 support the connecting end 21 of the chain 20, and the gap existing between the two support elements 70 and the smaller U-shaped recess of the recess 60 allows the passage of the next link to the connecting end 21 of the chain 20 attached to the pile 100. These connecting elements 70 allow keeping the connecting end 20 of the chain 20 above the surface of the horizontal plate 12. Accordingly, the connecting end 21 may project partially from said surface of the horizontal plate 12, leaving part of the void of the link formed by said connecting end 21 above the horizontal plate 12.

According to some implementations, as shown in FIG. 1, the frame 10 comprises a door 40 which is articulated at two ends 41 in two articulated attachments 51 projecting from two vertical plates 50. Said vertical plates 50 project from the front edge 16 of the horizontal plate 12 where the recess 60 opens, said vertical plates 50 being located on the sides of the horizontal plate 12. To mount the door 40 in the frame 10, the ends 41 of said door 40 are arranged in the articulated attachments 51 of the horizontal plate 12, and a removable pin 42 is then introduced in each articulated attachment 51. To open the door 40 without dismounting it, one of the pins 42 is removed, the door 40 being able to rotate about the other articulated attachment 51.

The door 40 comprises a projection 43 on the side of the front edge 16 of the horizontal plate 12, such that when said door 40 is closed, the projection 43 is introduced in the recess 60 of the horizontal plate 12, and said projection 43 is held on the side of the connecting end 21 of the chain 20. Therefore, said connecting end 21 is kept in the vertical position by adjusting the position of said connecting end 21 with respect to the attachment element 220.

Figure 6:
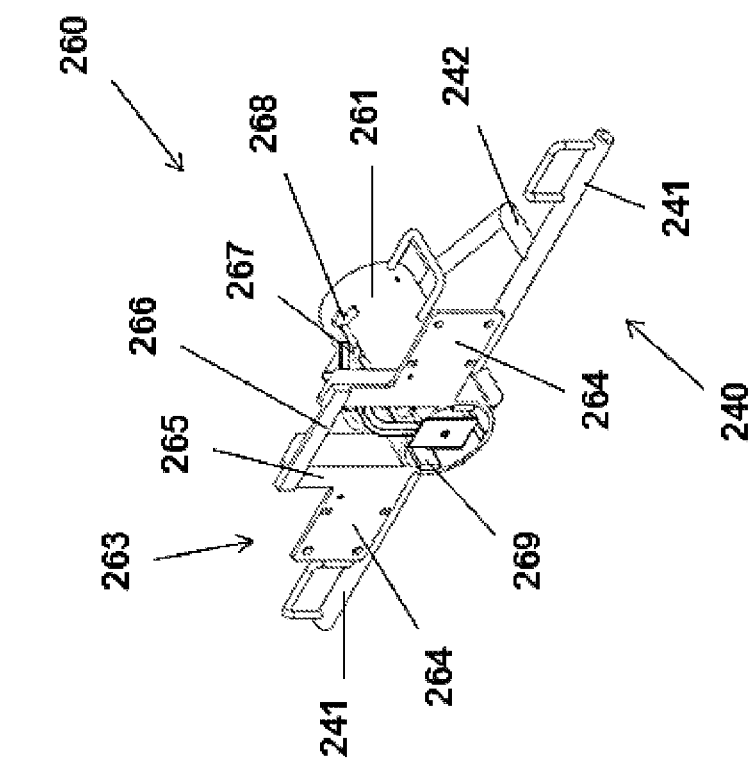
FIG. 6 shows a rear perspective view of the connecting unit of FIG. 5.
Figure 5:
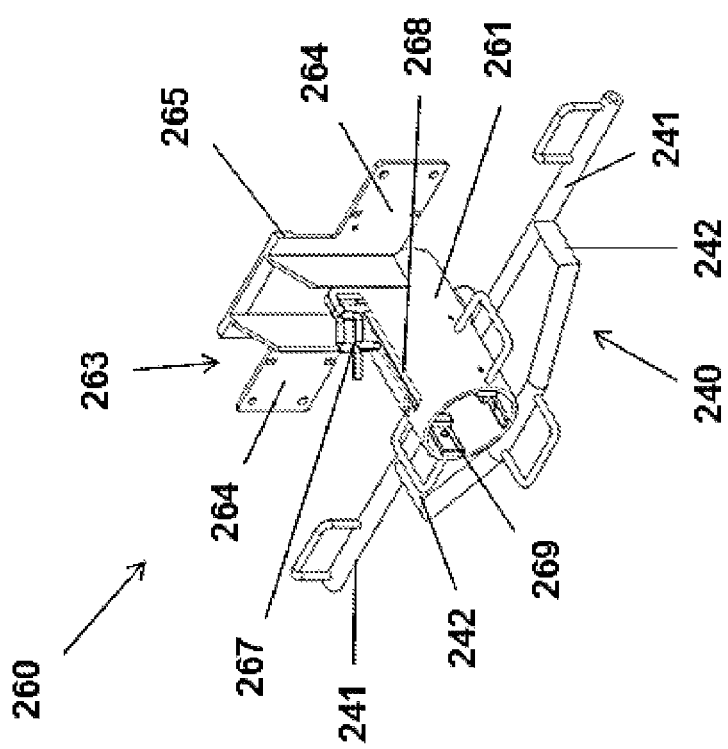
FIG. 5 shows a front perspective view of the connecting unit of the fixing means of the mooring assembly of FIG. 1.
Figure 8:
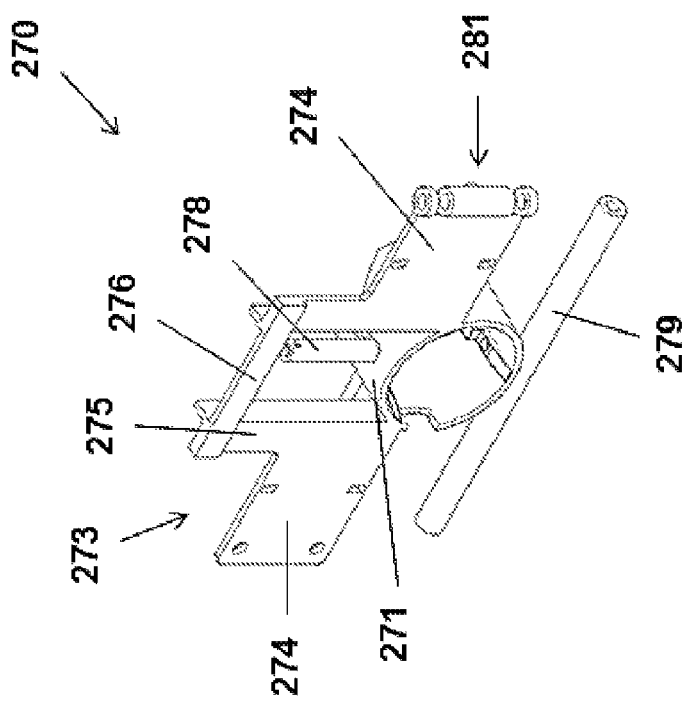
FIG. 8 shows a rear perspective view of the locking unit of FIG. 7.
Figure 7:
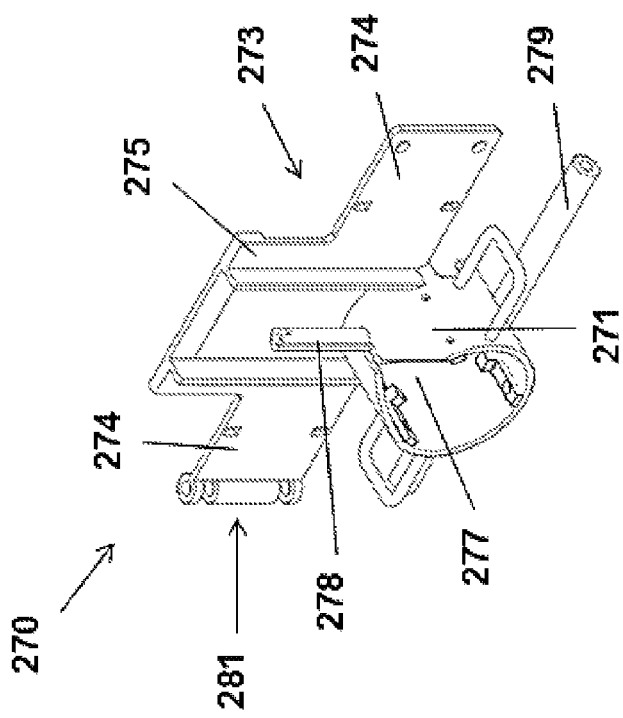
FIG. 7 shows a front perspective view of the locking unit of the fixing means of the mooring assembly of FIG. 1.

FIG. 5 shows a front perspective view of a connecting unit 260 of the fixing means 250 of the mooring assembly 300 of FIG. 1, and FIG. 6 shows a rear perspective view of the connecting unit 260 of FIG. 5. FIG. 7 shows a front perspective view of a locking unit 270 of the fixing means 250 of the mooring assembly 300 of FIG. 1, and FIG. 8 shows a rear perspective view of the locking unit 270 of FIG. 7.

According to some implementations the fixing means 250 of the coupling means 230 of the mooring assembly 300 comprises a connecting unit 260 and a locking unit 270 which are coupled to the side walls 224 of the attachment element 220. The connecting unit 260 comprises a tubular connecting body 261 housing therein the second bolt 262. The connecting unit 260 comprises a thrust element 267 for thrusting the second bolt 262, said thrust element 267 being guided in a longitudinal groove 268 comprised in the tubular connecting body 261. The second bolt 262 is introduced into the tubular connecting body 261 before deploying the attachment assembly 210 from the surface. The second bolt 262 sits inside the tubular connecting body 261 in longitudinal guides 269, for example three Teflon guides distributed every 120°, to assure the sliding of the second bolt 262.

The locking unit 270 comprises a tubular locking body 271 housing therein an anchoring element 272 which, according to one implementation, is a nut. This anchoring element 272 is guided and positioned with respect to the free end of the second bolt 262 by the tubular locking body 271. Said tubular locking body 271 may comprise an angular cut 277 starting at the outer edge of the tubular locking body 271 and comprising a longitudinal groove at the end thereof. Said angular cut 277 allows better viewing the free end of the second bolt 262 when it is in the tubular locking body 271, and the anchoring element 272 can thus be securely attached to the second bolt 262. At the end of the longitudinal groove of the angular cut 277 of the tubular locking body 271, the locking unit 270 also comprises a radial conduit 278 facilitating the introduction of a pin (not shown in the drawings). This pin allows assuring immobilization of the anchoring element 272 once attached to the second bolt 262.

In the implementations of FIGS. 5 and 6, the connecting unit 260 comprises a first plate 263 attached to the tubular connecting body 261, said first plate 263 being perpendicular to the tubular connecting body 261, and being attached at the end of said tubular connecting body 261, contacting with one of the side walls 224 of the attachment element 220. In the implementations of FIGS. 7 and 8, the tubular locking body 270 comprises a second plate 273 attached to the tubular locking body 271, said second plate 273 being perpendicular to the tubular locking body 271, and being attached at the end of said tubular locking body 271 contacting with one of the side walls 224 of the attachment element 220. Said first plate 263 and second plate 273 are held on the outer surface of each side wall 224, respectively, and project laterally from said side walls 224. The locking unit 270 comprises a horizontal rod 279 arranged below the tubular body 271 which is held in the projection 43 of the door 40 when said door 40 is closed.

Figure 9:
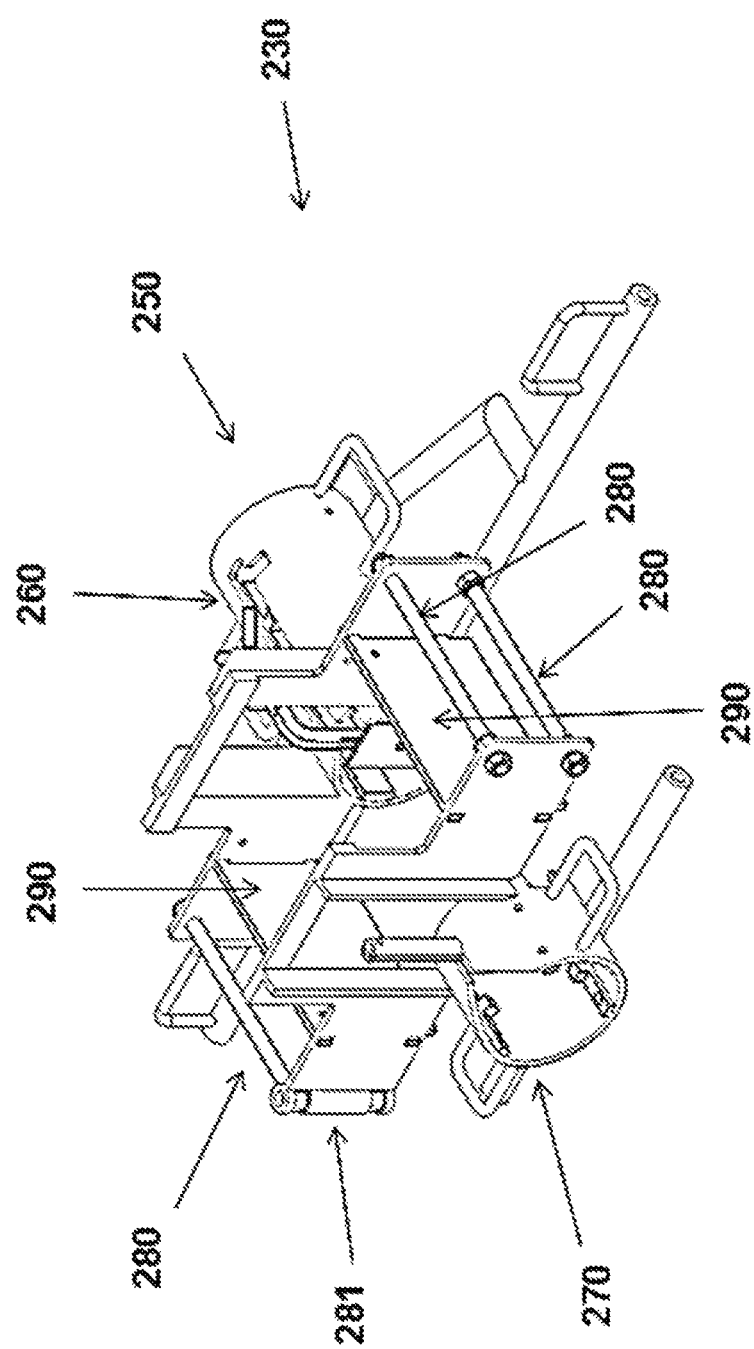
FIG. 9 shows a perspective view of the coupling means of the mooring assembly of FIG. 1 with the attachment means and the protecting means attached to the fixing means.

FIG. 9 shows a perspective view of the coupling means 230 of the mooring assembly 300 of FIG. 1, with attachment means 280 and protecting means 290 attached to the fixing means 250. The coupling means 230 comprise attachment means 280 which allows attaching the first plate 263 with the second plate 273 on each side of the side walls 224 of the attachment element 224. In this embodiment, said attachment means 280 comprises a pair of metal rods or rods made of another material screwed or attached with nuts onto the first plate 263 and the second plate 273, which can withstand the coupling force attaching the connecting unit 260 and the locking unit 270 to the attachment element 220.

According to one implementation the plate 263 of the connecting unit 260 comprises two side flanges 264 projecting from the respective side wall 224 of the attachment element 220 once the connecting unit 260 is coupled to the attachment element 220. Said plate 263 may also comprise an upper flange 265 arranged above the tubular connecting body 261. According to one implementation the plate 273 of the locking unit 270 comprises two side flanges 274 projecting from the respective side wall 224 of the attachment element 220 once the locking unit 270 is coupled to the attachment element 220. Said plate 273 may also comprise an upper flange 275 arranged above the tubular locking body 271.

Figure 10:
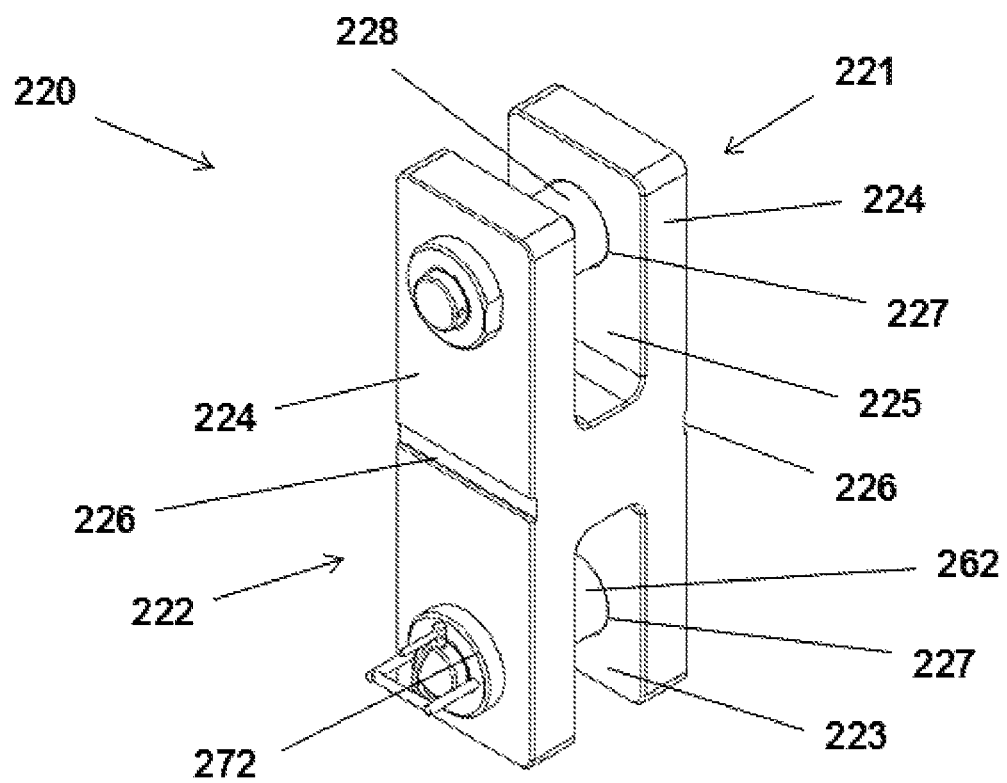
FIG. 10 shows a perspective view of the attachment element of the mooring assembly of FIG. 1.
Figure 11:
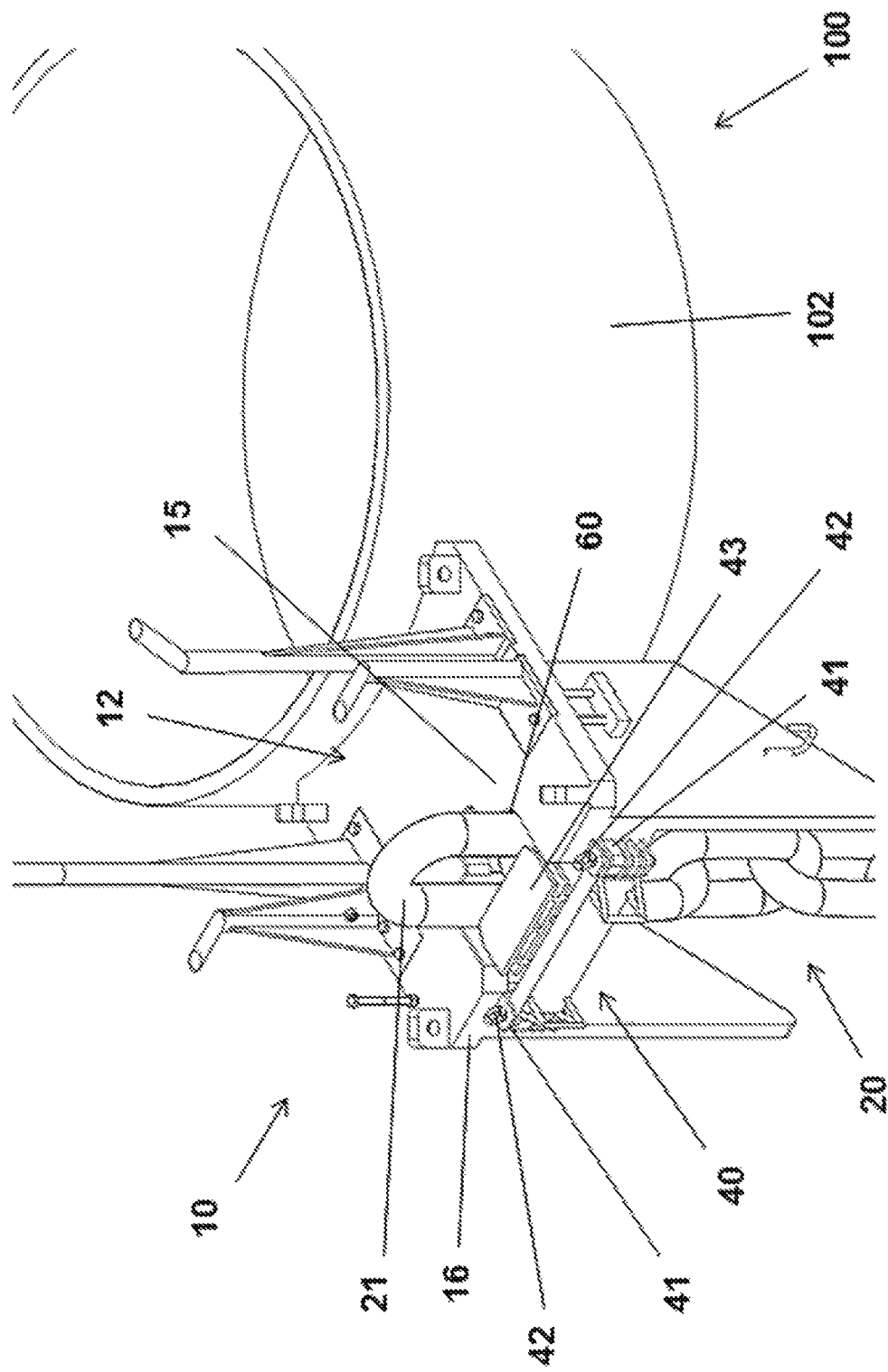
FIGS. 11-18 show steps for mooring a pile with a mooring line according to one implementation.
Figure 13:
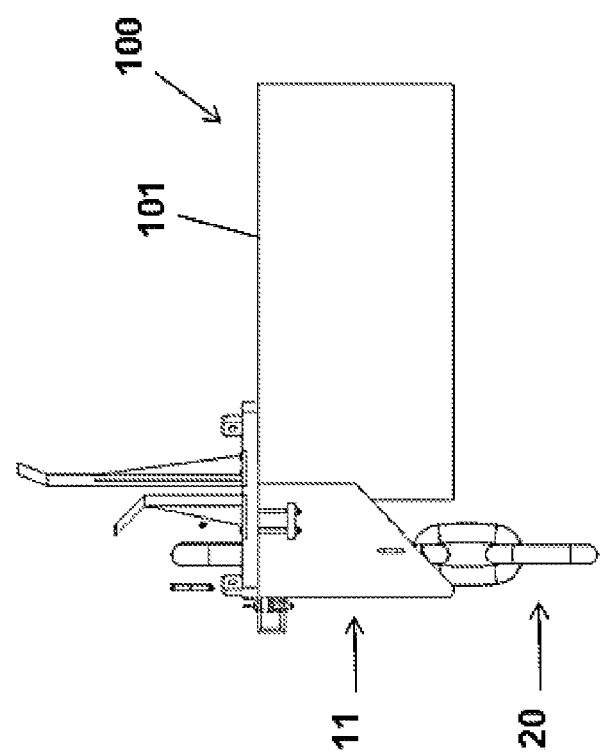
Figure 12:
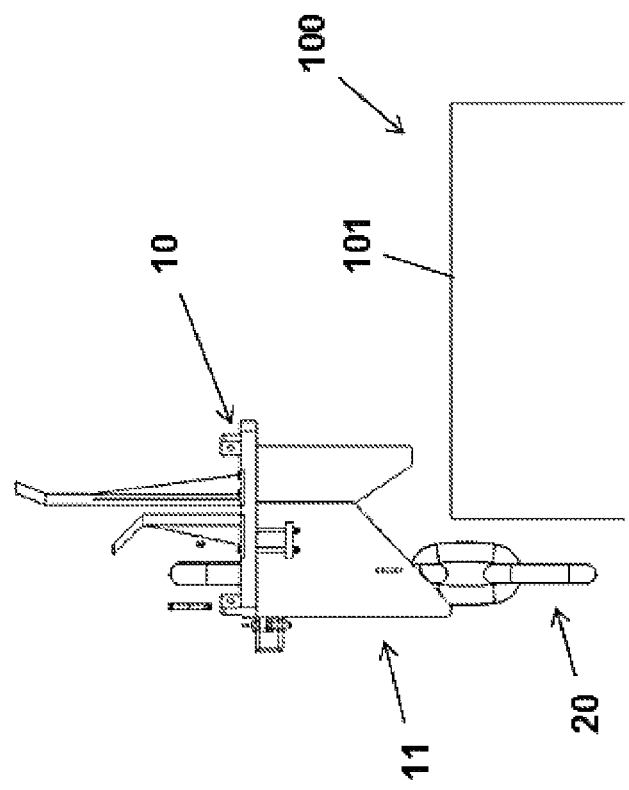
Figure 15:
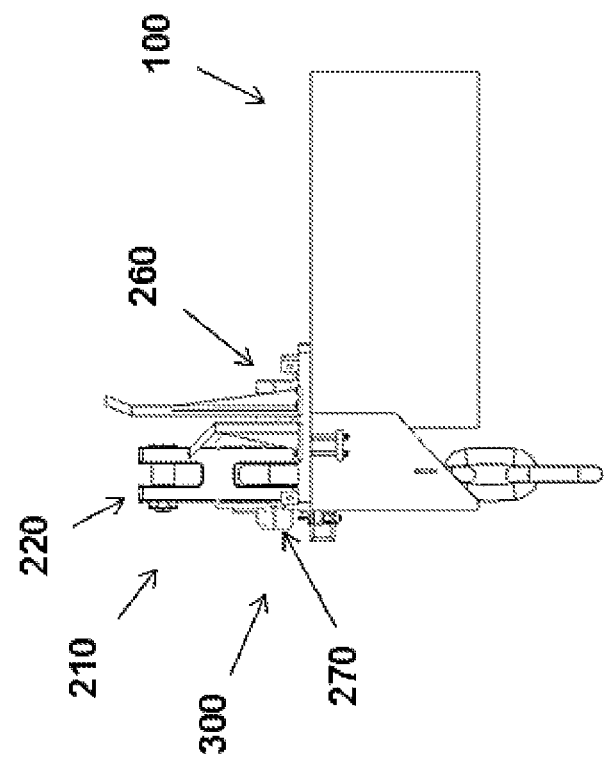
Figure 14:
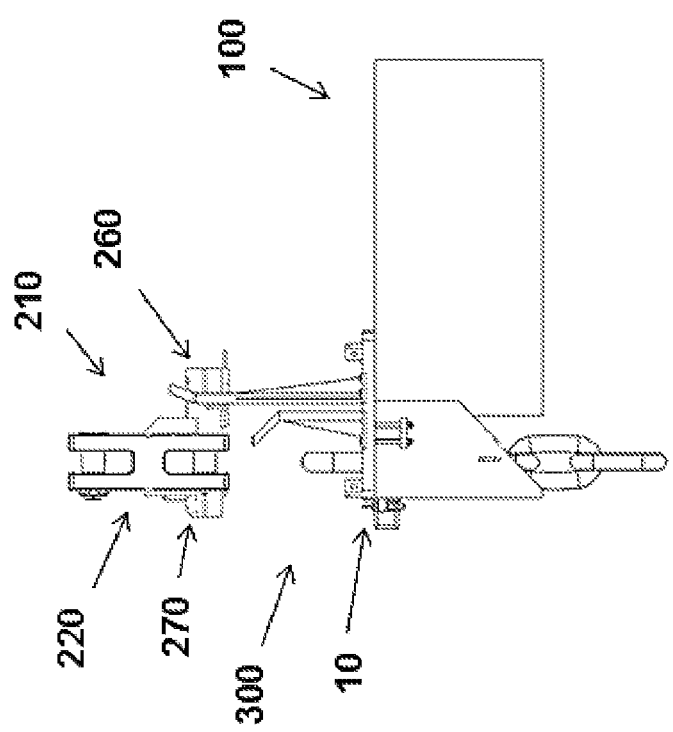
Figure 17:
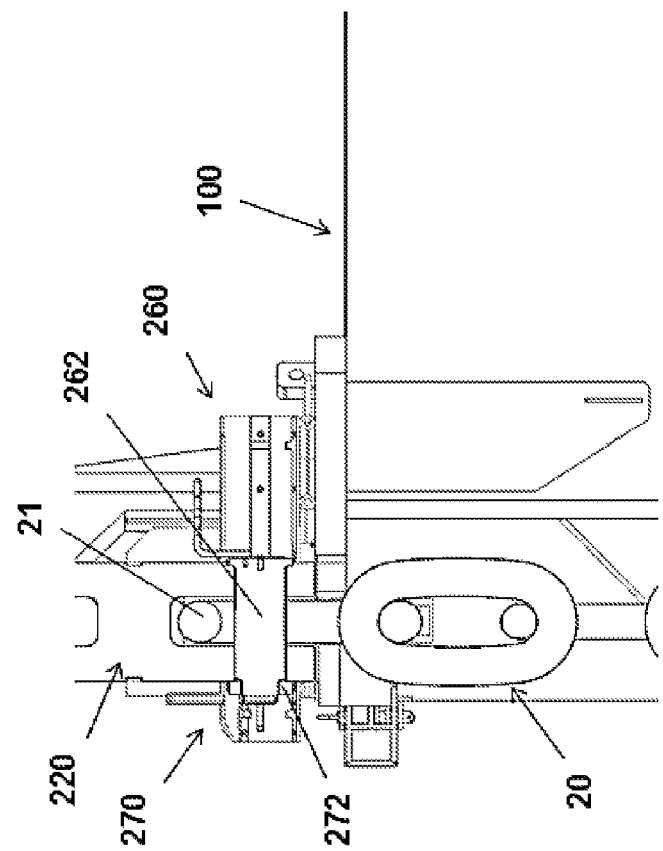
Figure 16:
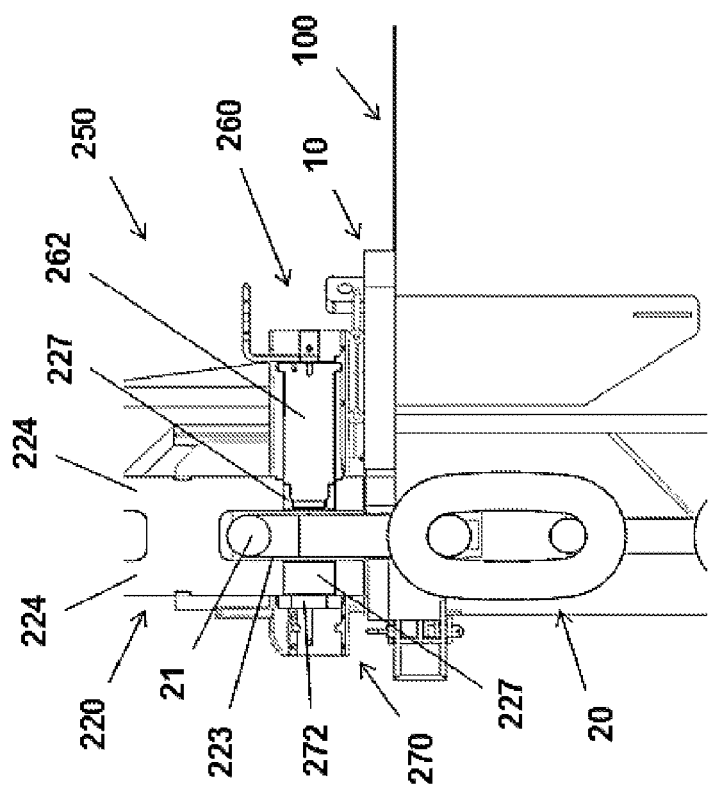
Figure 18:
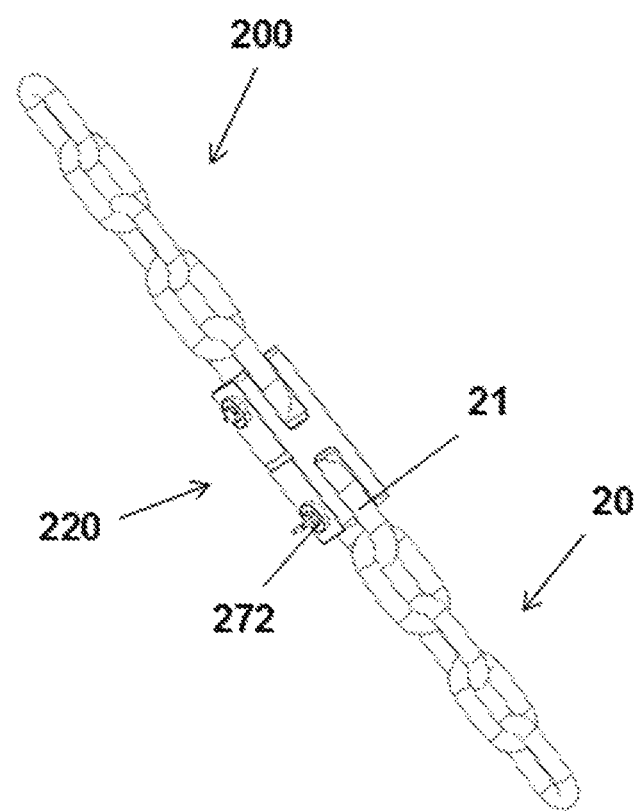

FIG. 10 shows a perspective view of the attachment element 220 of the mooring assembly 300 of FIG. 1. According to one implementation the attachment element 220 of the mooring assembly 300 comprises a lower space 223 coinciding with the lower void of the H-shaped shackle. When the attachment assembly 210 is guided with respect to the frame 10, as will be described below, the second end 222 of the attachment element 220 is held in the support area 15 of the horizontal plate 12 of the frame 10 and above the recess 60, such that the connecting end 21 of the chain 20 is arranged, once supported in the support elements 70, in the lower space 223 of the attachment element 220. The attachment element 220 comprises in each of its side walls 224 holes 227 traversing said side walls at the height of the lower space 223 and upper space 225.

According to one implementation each side wall 224 of the attachment element 220 comprises a horizontal groove 226 on the outer surface, these horizontal grooves 226 being arranged at a height in the side walls 224 between the lower space 223 and the upper space 225. The upper flange 265 of the first plate 263 is a span joining the two side flanges 264 and may comprise a projection 266. Similarly, the upper flange 275 of the second plate 273 is a span joining the two side flanges 274 and may comprise a projection 276. The projection 266 of the upper flange 265 and the projection 276 of the upper flange 275 are introduced, respectively, in each groove 226 of each side wall 224 when the connecting unit 260 and the locking unit 270 are coupled to the attachment element 220.

Therefore, when the mooring assembly 300 is deployed from the surface to be coupled to the pile 100, the attachment means 280, together with the coupling of the connecting unit 260 and locking unit 270 to the attachment element 220, prevent the fixing means 250 from being lost or detached from said mooring assembly 300 during transport to the pile 100.

The end of the tubular connecting body 261 is open and contacts with the corresponding side wall 224 of the attachment element 220, said open end coinciding with the hole 227 of the side wall 224. The axial axis of the tubular connecting body 261 and the axial axis of the hole 227 coincide with one another. Similarly, the open end of the tubular locking body 271 contacts the corresponding side wall 224 of the attachment element 220, said open end coinciding with the hole 227 of the side wall 224. The axial axis of the tubular locking body 271 and the axial axis of the hole 227 coincide with one another. Therefore, when the second bolt 262 is moved in the tubular connecting body 261 by means of the thrust element 267, it traverses the lower space 223 of the attachment element 220 through the holes 227 and the void formed by the link of the connecting end 21 of the chain 20. When the free end of the second bolt 262 reaches the tubular locking body 271, it attaches the anchoring element 272 thereto, and this attachment is assured with the pin introduced through the radial conduit 278.

According to one implementation the plate 273 of the locking unit 270 comprises an articulated attachment 281 at one end of one of the side flanges 274. According to other implementations the articulated attachment 281 can be arranged in the first plate 263 of the connecting unit 260 at one end of one of the side flanges 264. Said articulated attachment 281 is articulated with the attachment means 280 of the side where it is arranged. To form the articulation, a pin 282, shown in FIG. 9, which allows pivoting the second plate 273 in the articulated attachment 281, is introduced. After interconnecting the mooring line 200 and the chain 20 of the pile 100, it is necessary to release said chain 20 from its coupling with the frame 10 and the coupling means 230. To that end, one of the steps to be performed is to separate the locking unit 270 from its coupling with the attachment element 220. To that end, by means of the elimination of the attachment means 280 from the side opposite the location of the articulated attachment 281, the locking unit 260 can be uncoupled from the attachment element 220, separating the projection 276 from the groove 226 of the side wall 224, and the locking unit 270 can be rotated about the articulated attachment 281.

The coupling means 230 may also comprise protecting means 290 extending between the first plate 263 of the locking unit 260 and the second plate 273 of the connecting unit 270. The protecting means 290 may comprise metal plates or plates made of another material, and said plates are arranged on each side of the attachment element 220 between the lower space 223 and the attachment means 280 of said side. The function of said protecting means 290 is to protect the connecting end 21 of the chain 20 in the attachment thereof with the attachment element 220 from possible sparks and aggressions of another type when mooring works are performed between the mooring line 200 and the chain 20.

As shown in FIGS. 5 and 6, the guide means 240 of the coupling means 230 comprise first horizontal rods 241 projecting laterally from the connecting unit 260, being in contact with the lower part of the tubular connecting body 261, and forming a horizontal plane. The guide means 240 also comprise second horizontal rods 242 projecting perpendicularly from the first horizontal rods 241, being arranged in the same horizontal plane formed by the first horizontal rods 241 and the lower part of the tubular connecting body 261.

In the implementation of FIGS. 3 and 4 the frame 10 of the mooring assembly 300 comprises two guiding elements 80, each guiding element 80 comprising a pair of separated vertical rods 81 comprising an end with an inclined section 82. The guide means 240 are aligned with the guiding elements 80 when the attachment assembly 210 of the mooring assembly 300 is deployed from the surface towards the frame 10. The attachment element 220 of the attachment assembly 210 is held in the frame 10, and the first horizontal rods 241 are tightly inserted between each pair of vertical rods 81, as shown in FIGS. 1 and 2. The second horizontal rods 242 are held laterally in a tight manner in the vertical rods 81. The function of the inclined sections 82 of the vertical rods 81 is to guide the entry of the first horizontal rods 241 between each pair of vertical rods 81.

The frame 10 may comprise a plurality of attachment elements 30 as shown in FIGS. 1 through 4. The guiding elements 80 comprise bases 19 on which each vertical rod 81 is held. According to some implementations the attachment elements 30 are metal plates with two fasteners projecting from their surface, said fasteners going through the horizontal plate 12 of the frame 10, and being attached to the bases 19 of the guiding elements 80 by means of welding, threads or nuts. To that end, the attachment elements 30 are arranged below the horizontal plate 12, and between the vertical side plates 13 of the adaptation means 11 of the frame 10 and the side edge of the horizontal plate 12. The elimination of the attachment elements 30 by means of shearing the fasteners or by means of unthreading or releasing the nuts, allows the removal of the guiding elements 80 from the surface of the horizontal plate 12.

According to one implementation a mooring is accomplished, for example, with a mooring assembly 300 such as that shown in FIGS. 1-10 suitable for mooring a pile 100 with a mooring line 200. Said mooring assembly 300 comprises a frame 10 coupleable to the pile 100, said frame 10 supporting a connecting end 21 of a chain 20, and a mooring end of the chain 20 being connected to the outside of the pile 100 by means of a pad eye or lug. The mooring assembly 300 also comprises an attachment assembly 210 connected to one end of the mooring line 200, the attachment assembly 210 comprising an attachment element 220 for attachment with the mooring line 200 suitable for being supported in the frame 10, and coupling means 230 coupled to the attachment element 220 which allow positioning said attachment element 220 with respect to the connecting end 21 of the chain 20. The coupling means 230 in turn comprise guide means 240 for positioning the attachment element 220 on the frame 10, and fixing means 250 allowing the interconnection of the attachment element 220 and the connecting end 21 of the chain 20.

FIGS. 11-18 show the steps for mooring a pile 100 with a mooring line 200 according to one implementation. Said method comprises:

a step of introducing the pile 100 in the water, in which the pile 100 has the chain 20 at the mooring end, connected to its outer side wall 102. The pile 100 is driven into the seabed (not shown in the drawings), leaving the connecting end 21 of the chain 20 opposite the mooring end free and resting on the seabed, a step of introducing the frame 10 in the water and of coupling the connecting end 21 of the chain 20 in a guided manner in said frame 10 with the aid of an ROV, a step of coupling the frame 10 to an open upper end 101 of the pile 100 by means of coupling adaptation means 11 of the frame 10 on the upper end 101 of the pile 100, a step of introducing the mooring line 200 in the water, said mooring line 200 incorporating the attachment assembly 210 and directing the attachment assembly 210 to the frame 10, a step of guiding and positioning the attachment element 220 of the attachment assembly 210 on or adjacent a recess 60 of the support area 15 of a horizontal plate 12 of the frame 10, arranging the connecting end 21 of the chain 20 in a lower space 223 of the attachment element 220, which may be an H-shaped shackle, a step of interconnecting the attachment element 220 with the connecting end 21 of the chain 20, moving a second bolt 262 housed in a connecting unit 260 of fixing means 250 of coupling means incorporated in the attachment assembly 210, with the aid of an ROV, said connecting unit 260 being coupled to the attachment element 220 on one of its side walls 224, said second bolt 262 traversing a hole 227 of the side wall 224, the space 223 of the attachment element 220, in which there is arranged the connecting end 21 of the chain 20, the second bolt 262 traversing the void formed by the link of said connecting end 21, and a second hole 227 of the other side wall 224 of the attachment element 220, a free end of the second bolt 262 entering a locking unit 270 of the fixing means 250 incorporated in the attachment assembly 210, said locking unit 270 being coupled to the attachment element 220 on the other side wall 224, and attaching an anchoring element 272 housed in said locking unit 270 with the free end of the second bolt 262 with the aid of an ROV, a step of removing and recovering the coupling means 230, eliminating at least one of the attachment means attaching the connecting unit 260 and the locking unit 270, and protecting means connecting said connecting unit 260 and said locking unit 270 and protecting the connecting end 21 of the chain 20 when it is arranged in the frame 10, rotating the locking unit 270 about an articulated attachment 281, and leaving a projection 43 of a door 40 of the frame 10 free, adjusting the position of said connecting end 21, recovering the fixing means 250, and eliminating attachment elements of the frame 10 that attach bases of guiding elements with the horizontal plate 12 of the frame 10, recovering the guiding elements with the aid of an ROV, a step of releasing the mooring line 200 which is connected to the chain 20 of the pile 100, opening the door 40 by means of removing a pin 42 comprised in the door 40 and allowing the articulation of said door 40 with the frame 10, and extracting the mooring line 200 attached to the chain 20 of the pile 100 with the aid of an ROV, and a step of removing and recovering the frame means 10, uncoupling the adaptation means 11 of the frame 10 from the upper end 101 of the pile 100, recovering said frame 10.

Clause 1: An assembly for mooring a pile (100) with a mooring line (200), comprising a frame (10) coupleable to the pile (100), said frame (10) supporting a connecting end (21) of a chain (20), and the other end of the chain (20) being connected to the outside of the pile (100), and an attachment assembly (210) connected at one end of the mooring line (200), the attachment assembly (210) comprising an attachment element (220) suitable for being supported in the frame (10), and coupling means (230) coupled to the attachment element (220) which allow positioning the attachment element (220) with respect to the connecting end (21) of the chain (20), the coupling means (230) comprising guide means (240) for positioning the attachment element (220) on the frame (10), and fixing means (250) allowing the interconnection of the attachment element (220) and the connecting end (21) of the chain (20).

Clause 2: The Assembly according to clause 1, wherein the attachment element (220) is an H-shaped shackle, comprising a first end (221) connected to the mooring line (200) by means of a first bolt (228) arranged at said end (221), and a second end (222) suitable for being connected to the connecting end (21) of the chain (20) arranged in the frame (10), the fixing means (250) comprising a second movable bolt (262) for fixing the connecting end (21) of said chain (20) to the second end (222) of the attachment element (220).

Clause 3: The assembly according to clause 2, wherein the fixing means (250) comprise a connecting unit (260) and a locking unit (270) which are coupled respectively to side walls (224) of the attachment element (220), the connecting unit (260) comprising a tubular connecting body (261) housing therein the second bolt (262), and the locking unit (270) comprising a tubular locking body (271) housing therein an anchoring element (272), the connecting end (21) of the chain (20) being arranged in a lower space (223) of the attachment element (220) when the end (222) of the attachment element (220) is supported in the frame (10), the second bolt (262), as it is moved from the tubular body (261), traversing the lower space (223), the connecting end (21) of the chain (20), and holes (227), arranged in the side walls (224), aligned axially with the tubular connecting body (261) and the tubular locking body (271), allowing connection with the anchoring element (272).

Clause 4: The assembly according to clause 3, wherein the connecting unit (260) comprises a first plate (263) attached to the tubular connecting body (261), and the locking unit (270) comprises a second plate (273) attached to the tubular locking body (271), the first plate (263) and the second plate (273) being held on the outer surface of each side wall (224), respectively, and projecting laterally from said side walls (224), the coupling means (230) comprising attachment means (280), which allow attaching the first plate (263) with the second plate (273), on each side of the side walls (224).

Clause 5: The assembly according to clause 4, wherein the first plate (263) comprises two side flanges (264) projecting from the respective side wall (224) of the attachment element (220), and an upper flange (265), and the second plate (273) comprises two side flanges (274) projecting from the respective side wall (224) of the attachment element (220), and an upper flange (275), each side wall (224) of the attachment element (220) comprising a horizontal groove (226) on the outer surface, a projection (266) of the upper flange (265) of the first plate (263) and a projection (276) of the upper flange (275) of the second plate (273), respectively, being introduced into each groove (226), the second plate (273) of the locking unit (270) comprising at one end of one of the side flanges (274) an articulated attachment (281) which is articulated with the attachment means (280) of said side, and in which there is introduced a pin (282) which allows pivoting the second plate (273) in the articulated attachment (281), the elimination of the attachment means (280) from the side opposite the location of the articulated attachment (281) allowing the rotation of the locking unit (270).

Clause 6: The assembly according to clause 4 or 5, wherein the coupling means (230) comprise protecting means (290) connecting the first plate (263) with the second plate (273), said protecting means (290) being arranged on each side of the attachment element (220), between the space (223) and the attachment means (280), the protecting means (290) preferably being plates.

Clause 7: The assembly according to any of clauses 3 to 6, wherein the guide means (240) of the coupling means (230) comprise first horizontal rods (241) projecting laterally from the connecting unit (260), and second horizontal rods (242) projecting perpendicularly from the first horizontal rods (241), and the frame (10) comprises at least two guiding elements (80), each guiding element (80) comprising a pair of separated vertical rods (81) comprising an end with an inclined section (82), the guide means (240) being aligned with the guiding elements (80) when the attachment element (220) is held in the frame (10), the first horizontal rods (241) being tightly inserted between each pair of vertical rods (81), and the second horizontal rods (242) being tightly held in the vertical rods (81).

Clause 8: The assembly according to clause 7, wherein the frame (10) comprises a plurality of attachment elements (30), the vertical rods (81) of the guiding elements (80) being supported on bases (19), the attachment elements (30) allowing attaching each base (19) with the frame (10), and the elimination of the attachment elements (30) allowing the removal of the guiding elements (80).

Clause 9: The assembly according to any of clauses 1 to 8, wherein the pile (100) is a hollow cylinder with an open end (101), the frame (10) comprising a horizontal plate (12) with a support area (15) where the attachment element (220) is held, and adaptation means (11) attached to the horizontal plate (12), said adaptation means (11) allowing coupling the frame (10) to the pile (100) at the upper end (101) thereof directly without adding attachment elements, and the removal of the frame (10) when mooring ends.

Clause 10: The assembly according to clause 9, wherein the adaptation means (11) comprise a plurality of vertical plates projecting from the lower part of the horizontal plate (12) of the frame (10), the vertical plates comprising a plurality of vertical side plates (13) arranged on both sides of the horizontal plate (12), on the lower part of said horizontal plate (12) from a front edge (16), which is the furthest from the longitudinal axis of the pile (100), up to a distance that allows contacting said vertical side walls (13) with a side wall (102) of the pile (100) through the outer part thereof when the frame (10) is coupled to the pile (100), and a plurality of vertical central plates (14) arranged around the center of the horizontal plate (12), and surrounded by the vertical side plates (13), on the lower part of the horizontal plate (12) from a rear edge (17), which is the closest to the longitudinal of the pile (100), up to a distance that allows contacting said vertical central walls (14) with the side wall (102) of the pile (100) through the inner part thereof when the frame (10) is coupled to the pile (100), forming a space between the vertical side plates (13) and the vertical central plates (14) which allows fitting the frame (10) at the end (101) of the pile (100), the horizontal plate (12) projecting from both sides of the side wall (102), and the support area (15) of the horizontal plate (12) being located outside the pile (100).

Clause 11: The assembly according to clause 10, wherein the support area (15) of the horizontal plate (12) comprises a recess (60) opening outwardly with respect to the pile (100) and allowing the passage of the chain (20), the frame (10) comprising support elements (70) projecting below the recess (60), said support elements (70) supporting the connecting end (21) of the chain (20), keeping said connecting end (21) projecting at least partially above the surface of the horizontal plate (12).

Clause 12: The assembly according to clause 11, wherein the frame (10) comprises a door (40) which is articulated at two ends (41) in two articulated attachments (51) projecting from two vertical plates (50), said vertical plates (50) projecting from the front edge (16) of the horizontal plate (12) where the recess (60) opens, a removable pin (42) being introduced in each articulated attachment (51), the door (40) comprising a projection (43) such that when said door (40) is closed, the projection (43) is introduced in the recess (60) of the horizontal plate (12), and said projection (43) is held in the connecting end (21) of the chain (20), adjusting the position of said connecting end (21) with respect to the attachment element (220), the locking unit (270) comprising a horizontal rod (279) arranged below the tubular body (271) which is held in the projection (43) of the door (40), the extraction of the pin (42) allowing the opening of the door (40), and thereby the opening of the recess (60).

Clause 13: A method for mooring a pile (100) with a mooring line (200), implemented with a mooring assembly (300) according to any of the preceding clauses that it comprises a step of introducing the mooring line (200) in the water, directing the attachment assembly (210) towards the frame (10), a step of guiding and positioning the attachment element (220) of the attachment assembly (210), a step of interconnecting the attachment element (220) with the connecting end (21) of the chain (20), and a step of releasing the mooring line (200).

Clause 14: The method according to clause 14, comprising a step of removing and recovering the coupling means (230) from the pile (100) before the step of releasing the mooring line (200) connected to the chain (20).

Clause 15: The method according to clause 13 or 14, comprising a step of removing and recovering the frame (10) after the step of releasing the mooring line (200) connected to the chain (20).

What is claimed is:

1. A coupling apparatus for coupling a connecting end of a chain section that is coupled with a pile to an end of a mooring line, the pile including a frame disposed on an upper end thereof, the frame having first and second spaced-apart guiding structures extending from an upper surface thereof, the coupling apparatus comprising:
    an attachment element having a first end configured to be connected to the end of the mooring line, and a second end configured to be connected to the connecting end of the chain section by a bolt, the second end of the attachment element comprising a wall having a through hole through which the bolt passes when the connecting end of the chain section is coupled to the attachment element,
    an assembly that fixes the location of the attachment element within the coupling apparatus, the assembly including a first part located on a first side of the attachment element and a second part located on a second side of the attachment element, the second part including a housing for receiving the bolt and a thrust element, the assembly being attached to and supported on the attachment element and configured to secure the connecting end of the chain with the attachment element by inserting the bolt through the second end of the attachment element and the connecting end of the chain section by use of the thrust element,
    at least one protruding rod coupled with or being co-extensive to the second part of the assembly, the at least one protruding rod configured to be held between the first and second spaced-apart guiding structures of the frame on the pile.

2. A coupling apparatus according to claim 1, wherein the frame and the at least one protruding rod each comprises a substantially horizontal structure.

3. A coupling apparatus according to claim 1, wherein the first part and the second part are attached to the attachment element by the use of fasteners that extend between the first and second parts, the fasteners holding the first and second parts against the first and second sides of the attachment element, respectively.

4. A coupling apparatus according to claim 3, wherein the first part comprises a first side flange and the second part comprises a second side flange, the fasteners extending between the first and second side flanges.

5. A coupling apparatus according to claim 3, wherein the first side of the attachment element includes a first groove and the second side of the attachment element includes a second groove, the first part having a first projection residing in the first groove, the second part having a second projection residing in the second groove.

6. A coupling apparatus according to claim 3, wherein the first part comprises first and second side flanges and the second part comprises first and second side flanges, the fasteners extending respectively between the first and second side flanges of the first and second parts.

7. A coupling apparatus according to claim 6, wherein the first part comprises a first upper flange that joins the first and second flanges of the first part and the second part comprises a second upper flange that joins the first and second flanges of the second part.

8. A coupling apparatus according to claim 7, wherein the first side of the attachment element includes a first groove and the second side of the attachment element includes a second groove, the first upper flange of the first part having a first projection residing in the first groove, the second upper flange of the second part having a second projection residing in the second groove.

9. A method of coupling a connecting end of a chain section that is coupled with a pile located under water to an end of a mooring line using a coupling apparatus, the coupling apparatus comprising an attachment element having a first end that is configured to be attached to the end of the mooring line, and a second end configured to be connected to the connecting end of the chain section by a bolt, the second end of the attachment element comprising a wall having a through hole through which the bolt passes when the connecting end of the chain section is coupled to the attachment element: and an assembly that fixes the location of the attachment element within the coupling apparatus, the assembly including a first part located on a first side of the attachment element and a second part located on a second side of the attachment element, the second part including a housing for receiving the bolt and a thrust element, the assembly being attached to and supported on the attachment element and at least one protruding rod coupled with or being co-extensive to the second part of the assembly, the at least one protruding rod configured to be held between first and second spaced-apart guiding structures that extending from an upper surface of a frame located on the pile, the method comprising:
    attaching the end of the mooring line to the first end of the attachment element,
    lowering the coupling apparatus under water and attaching the coupling apparatus to the pile by inserting the at least one protruding rod between the first and second spaced-apart guiding structures extending from the upper surface of the frame disposed on the pile; and
    by use of the assembly, securing the connecting end of the chain section to the second end of the attachment element by inserting the bolt through the second end of the attachment element and the connecting end of the chain section by use of the thrust element.

10. A method according to claim 9, further comprising removing the coupling apparatus from the frame after the connecting end of the chain section is secured to the second end of the attachment element.

11. A method according to claim 10, further comprising removing the attachment element from the assembly after the coupling apparatus has been removed from the frame.

12. A method according to claim 10, wherein the removing of the coupling apparatus from the frame comprises removing at least one of the first and second spaced-apart guiding structures from the upper surface of the frame.

13. A method according to claim 10, wherein the first and second spaced-apart guiding structures extending from the upper surface of the frame each have a base situated adjacent the upper surface of the frame, at least one of the bases being coupled with the frame with the use of a fastener, the method of removing the coupling apparatus from the frame including shearing the fastener.

14. A method according to claim 10, wherein the first and second spaced-apart guiding structures extending from the upper surface of the frame each have a base situated adjacent the upper surface of the frame, at least one of the bases being coupled with the frame by a threaded fastener that extends into the base, the method of removing the coupling apparatus from the frame including unthreading the threaded fastener from the at least one of the bases.

15. A method according to claim 10, wherein the first and second spaced-apart guiding structures extending from the upper surface of the frame each have a base situated adjacent the upper surface of the frame, at least one of the bases being coupled with the frame by a threaded fastener having a first end coupled to the at least one of the bases and a second end that resides below a lower surface of the frame, the second end of the fastener having a nut rotated thereon, the method of removing the coupling apparatus from the frame including removing the nut from the second end of the fastener.

16. An apparatus comprising:
a pile having a frame disposed on an upper end thereof, the frame having first and second spaced-apart guiding structures extending from the an upper surface thereof,
a chain section having a first end connected to the pile and a second free end,
a coupling apparatus for coupling the second end of the chain section to an end of a mooring line, the apparatus comprising:
an attachment element having a first end configured to be connected to the end of the mooring line, and a second end configured to be connected to the second end of the chain section by a bolt, the second end of the attachment element comprising a wall having a through hole through which the bolt passes when the connecting end of the chain section is a coupled to the attachment element,
an assembly that fixes the location of the attachment element within the coupling apparatus, the assembly including a first part located on a first side of the attachment element and a second part located on a second side of the attachment element, the second part including a housing for receiving the bolt and a thrust element, the assembly being attached to and supported on the attachment element and configured to secure the connecting end of the chain with the attachment element by inserting the bolt through the second end of the attachment element and the connecting end of the chain by use of the thrust element,
at least one protruding rod coupled with or being co-extensive to the second part of the assembly, the at least one protruding rod configured to be held between the first and second spaced-apart guiding structures of the frame on the pile.

17. An assembly according to claim 16, wherein the frame and the at least one protruding rod each comprises a substantially horizontal structure.

18. An assembly according to claim 16, wherein the first part and the second part are attached to the attachment element by the use fasteners that extend between the first and second parts, the fasteners holding the first and second parts against the first and second sides of the attachment element, respectively.

19. An assembly according to claim 18, wherein the first part comprises a side flange and the second part comprises a side flange, the fasteners extending between the first and second side flanges.

20. An assembly according to claim 18, wherein the first side of the attachment element includes a first groove and the second side of the attachment element includes a second groove, the first part having a first projection residing in the first groove, the second part having a second projection residing in the second groove.

21. An assembly according to claim 18, wherein the first part comprises first and second side flanges and the second part comprises first and second side flanges, the fasteners extending respectively between the first and second side flanges of the first and second parts.

22. An assembly according to claim 21, wherein the first part comprises a first upper flange that joins the first and second flanges of the first part and the second part comprises a second upper flange that joins the first and second flanges of the second part.

23. An assembly according to claim 22, wherein the first side of the attachment element includes a first groove and the second side of the attachment element includes a second groove, the first upper flange of the first part having a first projection residing in the first groove, the second upper flange of the second part having a second projection residing in the second groove.

* * * * *